(12) United States Patent
Oda et al.

(10) Patent No.: US 6,353,983 B1
(45) Date of Patent: Mar. 12, 2002

(54) SLIDER FOR SLIDE FASTENER

(75) Inventors: Kiyoshi Oda; Hideyuki Matsushima, both of Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/533,337

(22) Filed: Mar. 23, 2000

(30) Foreign Application Priority Data

Mar. 31, 1999 (JP) ............................................ 11-090773

(51) Int. Cl.⁷ .............................................. A44B 19/26
(52) U.S. Cl. ........................................................ 24/429
(58) Field of Search .................... 24/429–431; D11/221; 294/3.6

(56) References Cited

U.S. PATENT DOCUMENTS

| | | | |
|---|---|---|---|
| 1,962,479 A | * | 6/1934 | Carlile |
| 2,066,061 A | * | 12/1936 | Sundback |
| 2,096,680 A | * | 10/1937 | Gilmore |
| 2,253,494 A | * | 8/1941 | Carlile |
| 2,307,711 A | * | 1/1943 | Schaaff |
| 4,055,876 A | * | 11/1977 | Ackermann et al. |
| 4,268,939 A | 5/1981 | | Fukuroi |
| 5,690,444 A | * | 11/1997 | Yuuki et al. |

FOREIGN PATENT DOCUMENTS

| | | |
|---|---|---|
| EP | 0 390 585 A1 | 10/1990 |
| EP | 0 603 759 A1 | 6/1994 |
| JP | 61204506 | 12/1986 |

* cited by examiner

*Primary Examiner*—James R. Brittain
(74) *Attorney, Agent, or Firm*—Finnegan, Henderson, Farabow, Garrett & Dunner, L.L.P.

(57) ABSTRACT

This invention provides a slider for use in sport goods, and its surface is smooth without any protrusion thereby providing no danger to a user. On a top surface of an upper wing of a slider body for slide fastener, a thread attachment portion for attaching a thread body as a pull and a fixing portion for fixing molded resin body formed by insert-molding synthetic resin on the upper wing are formed integrally with the slider body. The thread attachment portion is formed by arranging tongue pieces each having a narrowed tip in the center of the upper wing such that they oppose each other. The thread body is placed between the tongue pieces and the tongue pieces are crimped so as to fix the thread body. Further, tongue pieces slightly smaller than the aforementioned tongue pieces having the same shape are formed back and forth of the thread attachment portion and the tips thereof are crimped inward so as to form the fixing portion. Then, synthetic resin is insert-molded to bury and cover the thread attachment portion to which the thread body is already attached and the fixing portion so that a molded resin body is formed on the upper wing and fixed thereon. As a result, there is provided a slider whose body has a smooth surface and only contains a flexible thread body.

11 Claims, 9 Drawing Sheets

SLIDER FOR SLIDE FASTENER

BACKGROUND OF THE INVENTION

1. Field of the Invention

The present invention relates to a slider for slide fastener for use mainly in sport uniform, and more particularly to a slider having a smooth surface with safety and no fear that it may injure a user, in which no protrusion such as a pull mounting portion is provided on the surface and no hard pull is attached.

2. Description of the Related Art

In a slider for slide fastener disclosed in U.S. Pat. No. 2,253,494, a through hole 34' passing through vertically is provided in a guide post 4' of a body 1' of the slider for slide fastener and a round thread 32' is threaded through this through hole 34' as shown in FIG. 14. Then, a stopper metal 35' is attached to both ends of this round thread 32' so as to prevent this round thread 32' from slipping out of the through hole 34'. As this kind of the slider for slide fastener, various type of the sliders have been conventionally known.

Further, according to a slider for slide fastener disclosed in Japanese Utility Model Laid-Open Publication No. 61-204506, as shown in FIG. 15, a concave portion 36' is provided in the surface of an upper wing 2' without provision of a pull on a body 1' of the slider for slide fastener so as to form a surrounding annular projection 37' and by coating resin paint in this concave portion 36', a swollen ornamental face 38' is formed.

Because, in the slider for slide fastener shown in FIG. 14 and described above, a position in which the round thread 32' is threaded in the slider body 1' is located at the front end of the body, upon opening the fastener, a front end thereof is raised, so that sliding operation cannot be carried out smoothly although closing operation of the slide fastener can be carried out smoothly. Further, because the round thread 32' is not fixed to the slider body 1', it moves freely so that a force is applied to the stopper metal 35' at the front end, and consequently, the stopper metal 35' may slip out of the round thread 32', so that the round thread 32' may slip out of the slider body 1'.

Further, in a slider on which other known thread body is attached, the thread body is not fixed to the slider so that it is capable of moving freely. Thus, the thread is likely to slip out of the slider.

Although the body 1' of the slider shown in FIG. 15 has a smooth surface having no fear of injuring a user, no pull is attached to the slider body 1' and therefore, it is inconvenient for sliding operation of the slider. Further, because there is no means provided for fixing the ornamental face 38' coated on the surface of the slider body 1', there is a fear that the ornamental face 38' may get separated from the slider body 1'. Therefore, there is a problem that this slider cannot be used in a stabilized condition for a long term.

SUMMARY OF THE INVENTION

Accordingly, the present invention has been achieved in views of the above-described problems and main object of the invention is to provide a slider for slide fastener having a smooth surface without any protrusion like a pull attachment portion, thereby providing no danger in sports accompanied with a violent action to ensure the safety, the slider being colorful and excellent in construction design. For this purpose, this slider includes molded resin body formed by insert-molding synthetic resin to form a smooth surface with a flexible thread body left on the slider body as a pull.

It is an object of the invention to provide a slider for slide fastener having a molded resin body fixing portion for fixing a molded resin body easily and firmly, the molded resin body being formed to fix the thread body onto the body of the slider.

Another object of the invention is to provide a slider for slide fastener having a thread attachment portion allowing a flat thread or a round thread to be attached to the body of the slider as a pull very easily.

Another object of the invention is to provide a slider for slide fastener having a thread attachment portion enabling the thread body to be attached to the body of the slider as a pull easily and accurately, the thread attachment portion having a function as a fixing portion for fixing the molded resin body.

Another object of the invention is to provide a slider for slide fastener, wherein the thread body is attached to the thread attachment portion provided on the body of the slider by inserting the thread body therein and then, the thread body is fixed by forming molded resin body on the top surface of the body.

Another object of the invention is to provide a slider for slide fastener, wherein the thread body can be fixed to the body of the slider in a ring-like shape, while this slider performs a stabilized sliding motion.

Another object of the invention is to provide a slider for slide fastener, wherein the thread body can be fixed to the body of the slider easily and the molded resin body can be fixed easily without a necessity of providing the body with a special fixing portion for fixing the molded resin body.

Still another object of the invention is to provide a slider for slide fastener capable of fixing the molded resin body accurately in a stabilized condition by specifying a shape of the fixing portion for fixing the molded resin body.

To achieve the above object, according to the main aspect of the invention, there is provided a slider for slide fastener having a thread attachment portion to which a thread body such as a flat thread and a round thread is to be attached as a pull, the thread attachment portion being provided integrally with a body of the slider on a top surface of a wing of the slider body (the wing mentioned here refers to an upper wing, lower wing or both wings) while the thread body is fixed to the thread attachment portion, and synthetic resin is insert-molded to bury and cover the fixing portion so that a molded resin body is formed on the top surface of the wing.

Preferably, a fixing portion for fixing the molded resin body is provided so as to protrude on a top surface of the wing of the slider body as well as the thread attachment portion and synthetic resin is insert-molded to bury the fixing portion or charged in the fixing portion so that the molded resin body is formed and fixed.

Further preferably, the thread attachment portion to be provided on the wing of the slider body is formed by arranging tongue pieces protruded from the top surface of the wing such that they oppose each other and a base portion of the thread body is placed between the opposing tongue pieces so that the tongue pieces are crimped over the thread body to fix the thread body while the molded resin body is formed thereon and fixed.

Alternatively, the thread attachment portion to be provided on the wing of the slider body is formed by providing an inverted clamp-shaped, i.e., U-shaped protruding plate on the top surface of the wing and the thread body is inserted into an insertion hole formed inside the protruding plate and a part of the protruding plate, i.e., a side in which the thread body is inserted is crimped from above to fix the thread body, while the molded resin body is formed thereon and fixed.

Further alternatively, the thread attachment portion to be provided on the wing of the slider body is formed by providing a clamp-shaped or inverted U-shaped protruding piece on the top surface of the wing; the center of the protruding piece is cut off or separated to form a notch portion; the thread body is inserted inside the protruding pieces and the protruding pieces are crimped from above to fix the thread body, while the molded resin body is formed thereon and fixed.

Still alternatively, the thread attachment portion to be provided on the wing of the slider body is formed by providing an arch piece protruded in an arch shape on the top surface of the wing and the thread body is inserted into the arch piece and the molded resin body is formed over the arch piece to be fixed.

Preferably, the thread attachment portion is formed on each of two positions front and rear of the wing of the slider body and an end portion of the thread body is fixed on each thread attachment portion while the molded resin body is formed thereon and fixed.

Alternatively, the thread attachment portion to be provided on the wing of the slider body is formed by providing a hook plate on the top surface of the wing and by inserting the hook plate into a hole portion provided in a base portion of the thread body, the thread body is attached to the hook plate while the molded resin body is formed over the hook plate and is fixed.

Preferably, the fixing portion for fixing the molded resin body to be provided on the wing of the slider body is formed by bending ends of the plural tongue pieces protruded from the top surface of the wing.

Alternatively, the fixing portion for fixing the molded resin body to be provided on the wing of the slider body is formed by cutting off a base portion of a projection provided so as to project on the top surface of the wing so that a concave portion is provided.

Further alternatively, the fixing portion for fixing the molded resin body to be provided on the wing of the slider body is formed by providing a T-shaped projecting piece on the top surface of the wing.

DESCRIPTION OF THE PREFERRED EMBODIMENTS

Hereinafter, the preferred embodiments of the slider for slide fastener will be described in detail with reference to the accompanying drawings.

In the slider for slide fastener of the present invention, mainly a slider body 1 is produced by dicasting zinc alloy or aluminum alloy and a thread body 30 produced by knitting or weaving synthetic resin yarns is attached on the top surface of the body 1 as a pull. To attach the thread body 30 on the body 1, a molded resin body 25 is formed by insert-molding synthetic resin such as polyurethane and polyester on the body 1 and the thread body 30 is fixed to the body 1. As a result, a slider without any protrusion on the surface of the body 1 is produced. The body 1 of the slider may be produced by polyamide, polyester and polypropylene as well as metal. Further, the molded resin body 25 on the body 1 may be formed using synthetic resin or rubber such as vinyl chloride, polyethylene, polyamide, polypropylene.

The thread body which composes the pull may be produced not only by knitting or weaving synthetic resin yarns but also be formed of synthetic resin material in a rectangular or linear shape having flexibility, resilience or plasticity, for example, mild vinyl chloride thread body.

Figure 1:
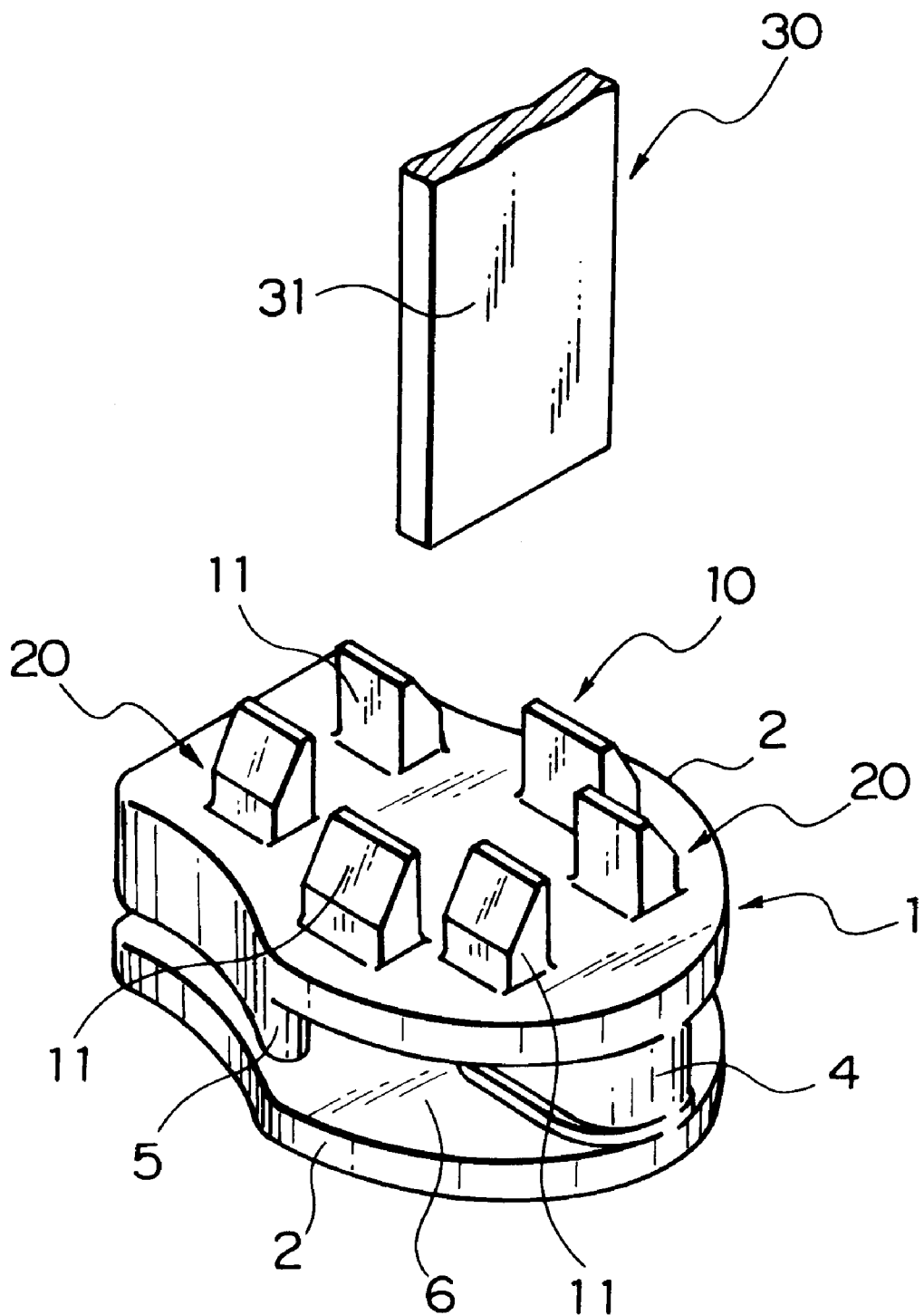
FIG. 1 is a perspective view of a slider for slide fastener according to a first embodiment at the time of production.

In the slider of the first embodiment shown in FIG. 1, the slider body 1 is so constructed that an upper wing 2 and a lower wing 2 are connected by a guide post 4. A guide flange 5 for guiding fastener elements is formed on each of both side edges of the upper wing 2 so that a guide groove 6 is provided. Relatively large tongue pieces 11 each having a narrowed tip are arranged on a top surface of the upper wing 2 such that they oppose each other in a lateral direction and protrude from the surface so as to form a thread body attachment portion 10. Then, plural pieces of smaller tongue pieces 11 than the tongue pieces 11 of the thread body attachment portion 10 are provided so as to protrude such that they oppose each other before and after this pair of the tongue pieces 11 to form a fixing portion 20 for fixing the molded resin body 25. As a result, the slider body 1 is completed.

Figure 2:
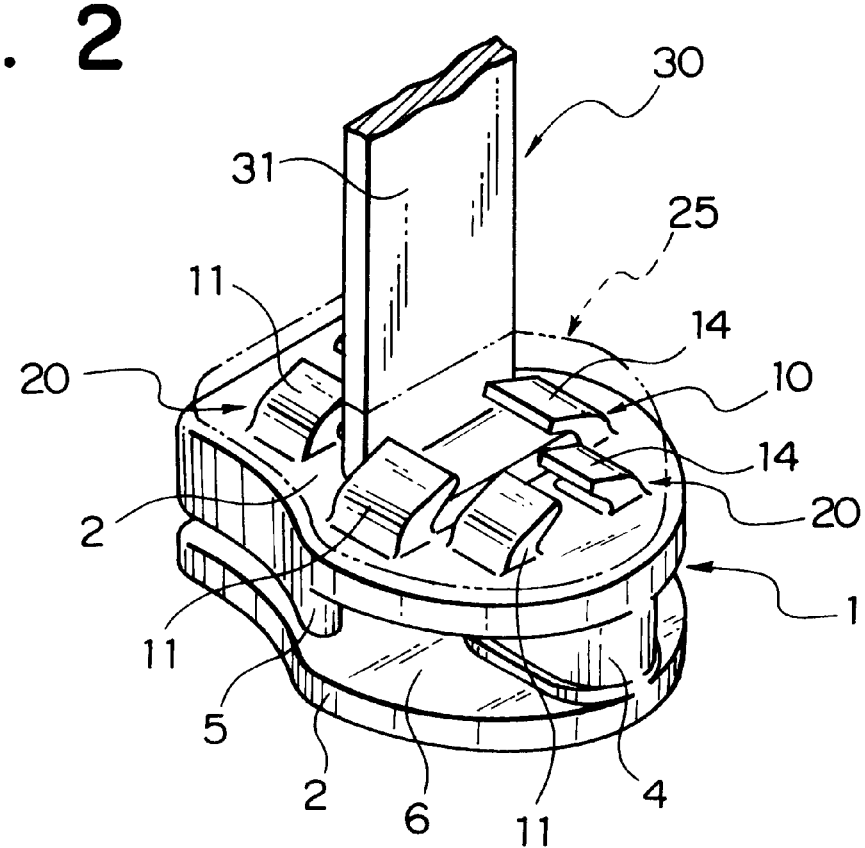
FIG. 2 is a perspective view of the slider of FIG. 1 at the time of attachment of a thread body.

To attach the thread body 30 onto the slider body 1 formed in the above manner, as shown in FIG. 2, a flat thread 31 capable of being received between the tongue pieces 11 and having a predetermined length is placed between the tongue pieces 11 of the thread attachment portion 10 formed on the upper wing 2 of the body 1, and the tongue pieces 11 are crimped inward from above with the thread body 30 interposed between the tongue pieces 11 so as to form a crimped portion 14. As a result, an end portion of the flat thread 31 is fixed so that the flat thread 31 is attached on the body 1. Then, end portions of the tongue pieces 11 on the fixing portion 20 for fixing the molded resin body 25, provided back and forth the thread attachment portion 10, are crimped inward so as to form a bent crimped portion 14. Meanwhile, it is permissible to crimp both the tongue pieces 11 at the fixing portion 20 and the tongue pieces 11 at the thread attachment portion 10 at the same time.

Figure 3:
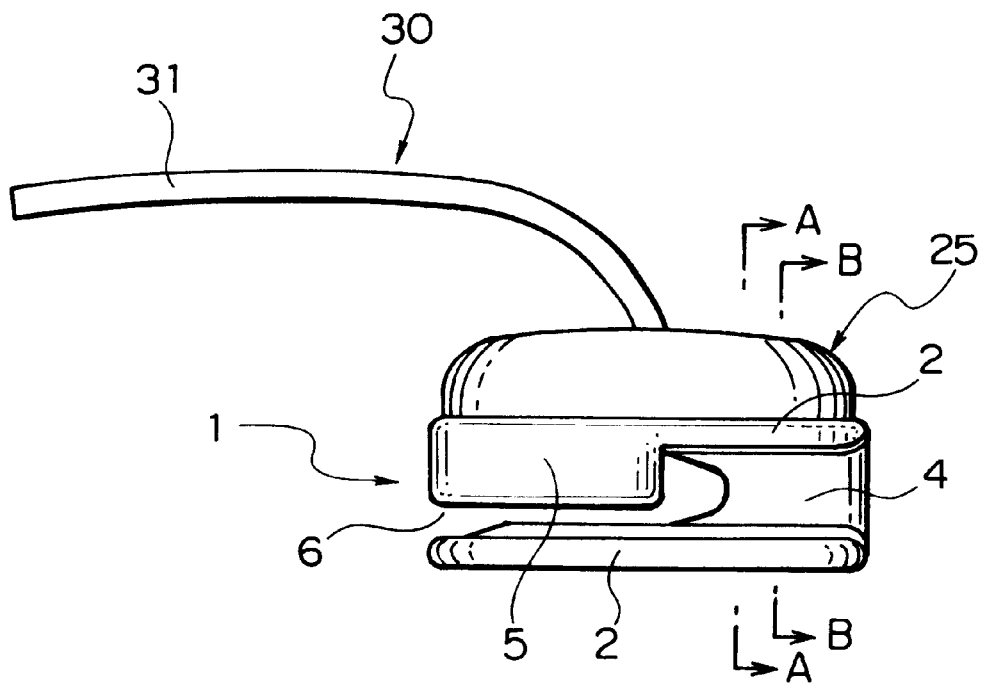
FIG. 3 is a side view of the slider of FIG. 1 after the slider is completed.
Figure 4:
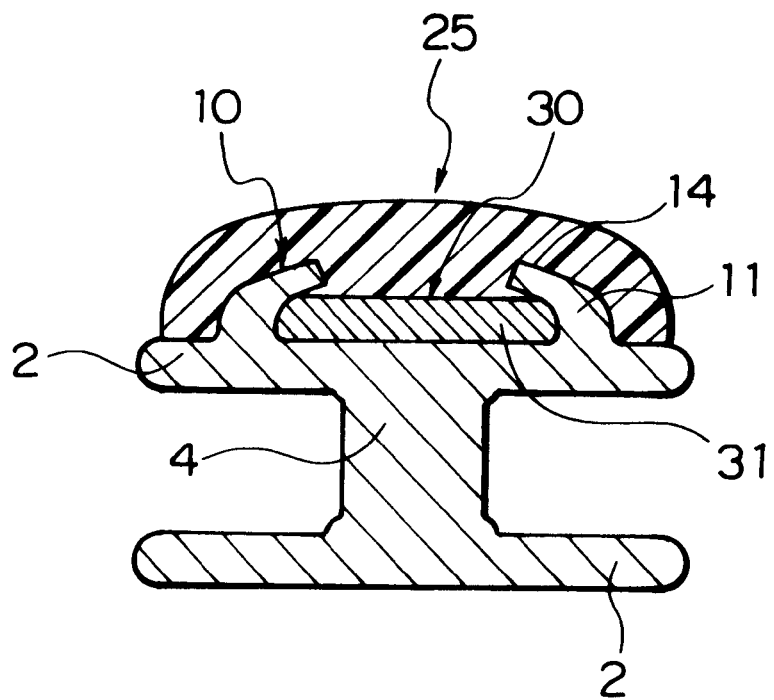
FIG. 4 a sectional view taken along the line A—A of the slider of FIG. 3.
Figure 5:
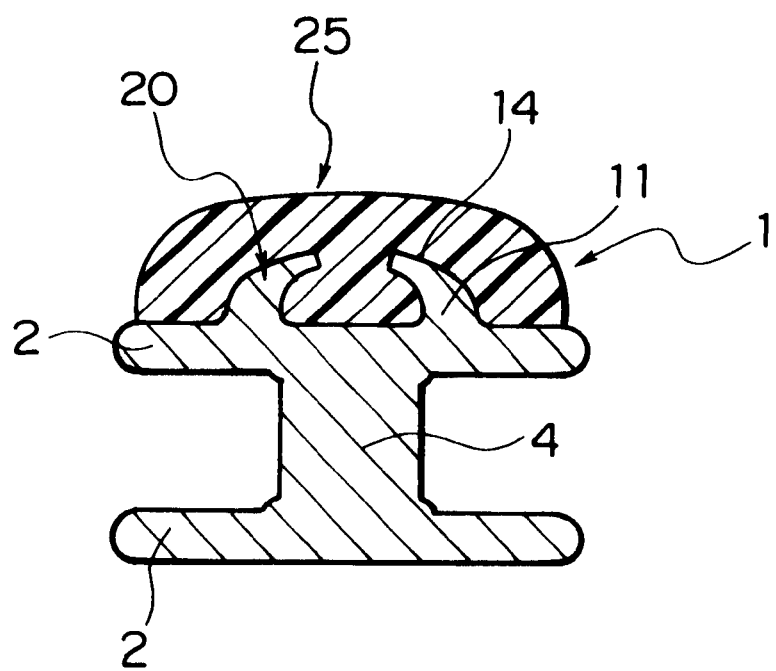
FIG. 5 is a sectional view taken along the line B—B of the slider of FIG. 3.

In the slider body 1 in which the flat thread 31 of a desired length is attached to the thread attachment portion 10 and the fixing portion 20 for fixing the molded resin body 25 is formed, as shown in FIG. 3, synthetic resin is insert-molded on the top surface of the upper wing 2 so as to bury and cover the thread attachment portion 10 and fixing portion 20, so that the molded resin body 25 is formed on the top surface of the upper wing 2. In the slider body 1 on which the molded resin body 25 is formed, as shown in FIGS. 4 and 5, the surface of the flat thread 31 fixed by the tongue pieces 11 of the thread attachment portion 10 is pressed by the molded resin body 25 and the bent tongue pieces 11 of the fixing portion 20 exists inside the molded resin body 25. Thus, the molded resin body 25 is never peeled from the upper wing 2. The slider is completed in a beautiful fashion because the flat thread 31 can be formed in various color patterns and the molded resin body 25 can be painted easily because it is of synthetic resin. Further, by using soft material for the molded resin body 25, a slider having a flexibility can be produced. Further, the molded resin body 25 may be transparent or translucent to improve its appearance.

Although in the above description, a case in which the thread attachment portion 10 for attaching the thread body 30 on the slider body 1 and the fixing portion 20 for fixing the molded resin body 25 are attached on the upper wing 2 of the body 1 has been described, the thread attachment portion 10 and the fixing portion 20 may be attached on the lower wing 2 of the body 1. Further, by attaching the thread attachment portion 10 and the fixing portion 20 on the upper wing 2 and lower wing 2, a double-sided slider may be formed. Meanwhile, the same configuration can be formed in each of sliders of embodiments which will be described below.

Figure 6:
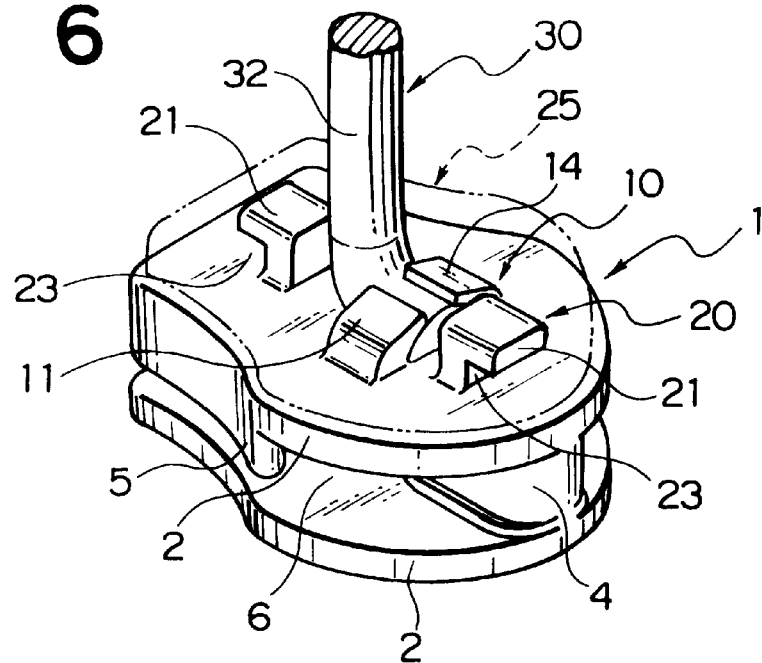
FIG. 6 is a perspective view of the slider for slide fastener according to a second embodiment at the time of attachment of the thread body.

In a slider of a second embodiment shown in FIG. 6, the tongue pieces 11 each having a narrowed tip are disposed so as to protrude from the surface such that they oppose each other so as to form the thread attachment portion 10 in the center of the top surface of the upper wing 2 of the slider body 1. An interval of the tongue pieces 11 is formed to be smaller than in the slider of the first embodiment so as to receive a round thread 32 which is employed as the thread body 30 for use as the pull. A projection 21 is formed before and after the thread attachment portion 10 so as to project and a lower portion of a base portion of this projection 21 is cut off to form a concave portion 23, so that the molded resin body 25 can be fixed firmly. The concave portions 23 in the projections 21 are desired to be made outside on the front and rear of the base portion.

In the slider body 1 formed in the above manner, the round thread 32 of a desired length is used as the thread body 30 between the tongue pieces 11 provided on the upper wing 2 such that they oppose each other and the end portion of the round thread 32 is disposed between the tongue pieces 11 and the tongue pieces 11 are crimped inward from above so as to form the crimped portion 14, thereby fixing the round thread 32. Then, synthetic resin is insert-molded so as to bury and cover the portion where the thread is fixed and the projection 21 of the fixing portion 20 formed on the upper wing 2. As a result, the molded resin body 25 is formed on the upper wing 2 so that the round thread 32 is mounted on the body 1.

Figure 7:
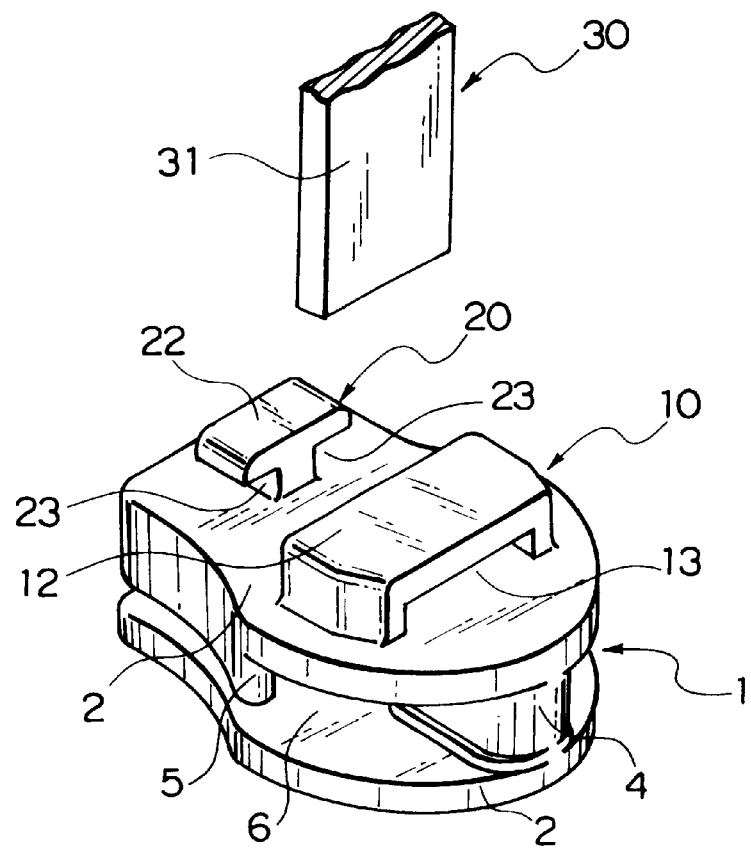
FIG. 7 s a perspective view of the slider for slide fastener according to a third embodiment at the time of production.

In a slider of a third embodiment shown in FIG. 7, a laterally long, wide clamp-shaped protruding plate 12, which is protruded in an inverted U shape, is provided on a top surface of the upper wing 2 of the slider body 1 so as to form the thread attachment portion 10. Likewise, a T-shaped projecting piece 22 having a substantially same height as the protruding plate 12 is provided so as to project on the side of a rear mouth of this protruding plate 12, so that the fixing portion 20 for fixing the molded resin body 25 is formed.

Figure 8:
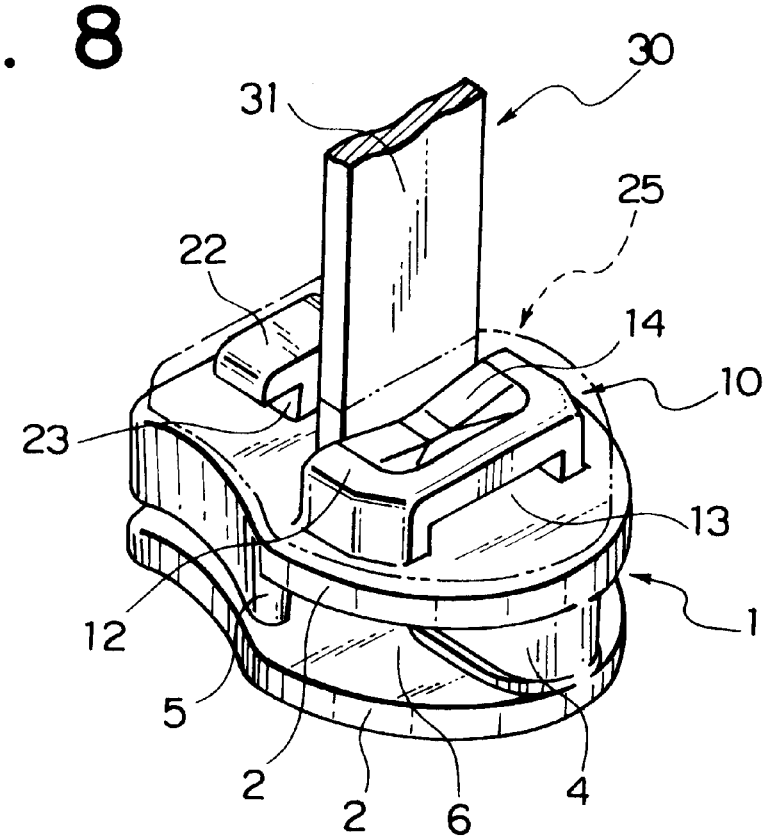
FIG. 8 is a perspective view of the slider of FIG. 7 at the time of attachment of the thread body.

In the slider body 1 formed in the above manner, an end of the flat thread 31 of a desired length as the thread body 30 is inserted into an insertion hole 13 formed in the wide, inverted U-shaped protruding plate 12 provided so as to protrude on the upper wing 2 and as shown in FIG. 8, a part of the protruding plate 12 on the side in which the flat thread 31 is inserted is crimped from above so as to form the crimped portion 14, thereby the flat thread 31 being fixed to the thread attachment portion 10.

Figure 9:
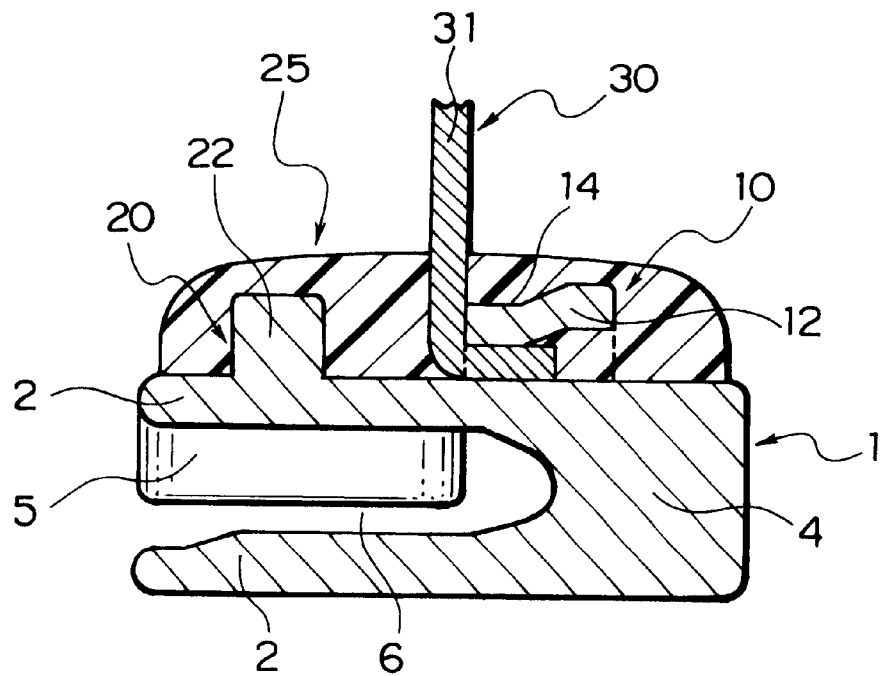
FIG. 9 is a longitudinal sectional view of the slider of FIG. 7 after the slider is completed.

In the slider body 1 on which the flat thread 31 is attached, synthetic resin is insert-molded so as to bury and cover the thread attachment portion 10 and the T-shaped fixing portion 20 on the upper wing 2, so that the molded resin body 25 is formed on a top surface of the upper wing 2 as shown in FIG. 9. As a result, synthetic resin is charged into a gap at a front portion of the protruding plate 12 of the thread attachment portion 10 and into the inside concave portion 23 of the T-shaped projecting piece 22 formed on the side of the rear mouth of the protruding plate 12, so that the molded resin body 25 is fixed firmly. Consequently, a slider having the flat thread 31 firmly fixed to the body 1 is produced.

Figure 10:
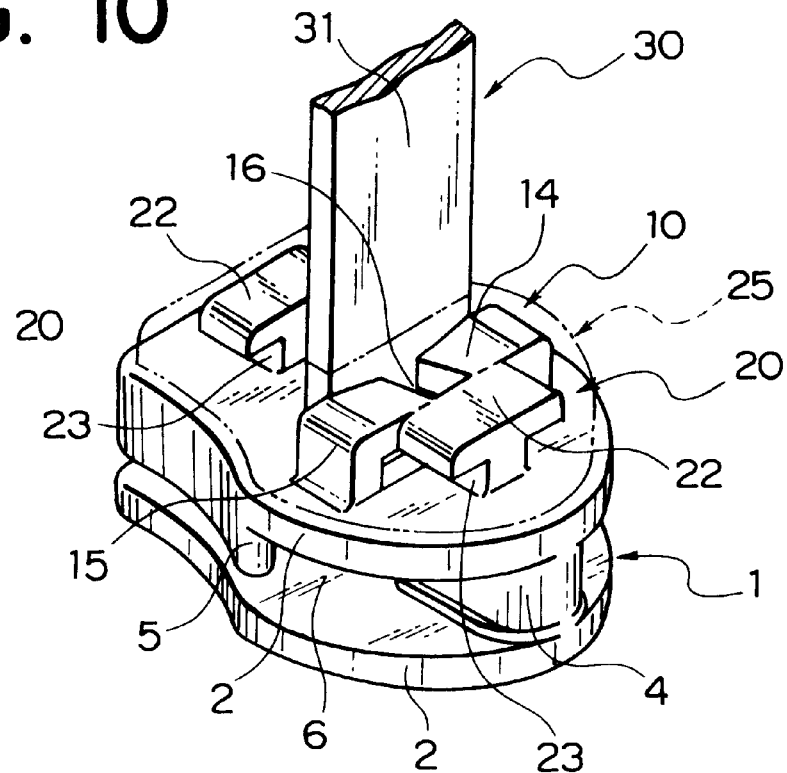
FIG. 10 is a perspective view of the slider for slide fastener according to a fourth embodiment at the time of attachment of the thread body.

In a slider according to a fourth embodiment shown in FIG. 10, a laterally long, narrow clamp-like protruding piece 15 having an inverted U-shape is provided on the side of a shoulder a little forward with respect to the center of the top surface of the upper wing 2 of the slider body 1. By cutting or separating the central portion of this protruding piece 15, a notch portion 16 is provided to form the thread attachment portion 10. It is convenient that the notch portion 16 is formed slightly obliquely because deformation is likely to occur upon crimping processing.

By providing the projecting piece 22 having a T-shape on a side of the shoulder forward of the thread attachment portion 10 formed on the top surface of the upper wing 2, the fixing portion 20 for fixing the molded resin body 25 is formed. Further, the projecting piece 22 having a T-shape is provided on the side of a rear mouth of the thread attachment portion 10 with an interval with respect thereto so as to form the fixing portion 20 for fixing the molded resin body 25.

In the slider body 1 formed in the above manner, the flat thread 31 having a desired length is inserted inside of the protruding piece 15 as the thread body 30 and the notch portion 16 is crimped from above so as to fix an end of the flat thread 31. After that, synthetic resin is insert-molded so as to bury and cover the projecting pieces 22 located back and forth, so that the molded resin body 25 is formed on the top surface of the upper wing 2. By charging the concave portion 23 of the T-shaped projecting pieces 22 located back and forth with synthetic resin, the molded resin body 25 is fixed firmly. As a result, the slider having the flat thread 31 firmly fixed to the body 1 is produced.

Figure 11:
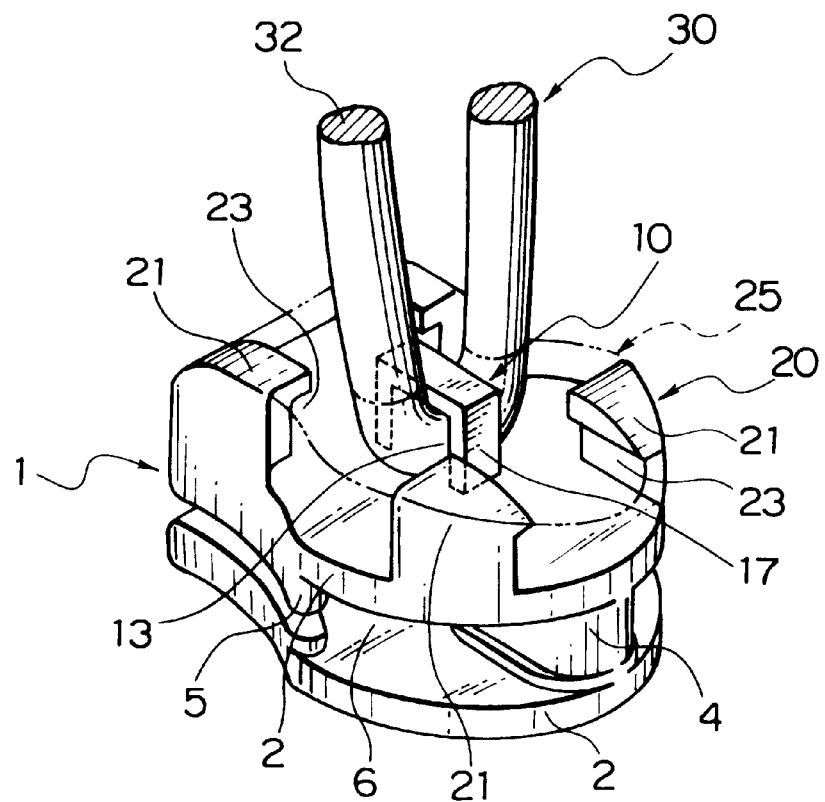
FIG. 11 is a perspective view of the slider for slide fastener according to a fifth embodiment at the time of attachment of the thread body.

In a slider of a fifth embodiment shown in FIG. 11, an arch-shaped arch piece 17 is provided substantially in the center of the slider body 1 such that it is elongated longitudinally so as to form the thread attachment portion 10. Further, projections 21 slightly higher than the arch piece 17 are provided at positions corresponding to substantially four corners on the top surface of the upper wing 2 of the body 1. The surface of the projection 21 is smooth and its outer side face coincides with an outer side edge of the body 1. A lower portion of the base portion of each of the protrusions 21 is cut off to form a concave portion 23 thereby the fixing portion 20 of the molded resin body 25 being formed.

In the slider body 1 formed in the above manner, a round thread 32 is inserted into an insertion hole 13 in the arch piece 17 formed longitudinally on the top surface of the upper wing 2 such that the round thread 32 is folded. Then, synthetic resin is insert-molded with reference to the surface of the projections 21 formed on the top face of the upper wing 2 such that the arch piece 17 is buried and covered. Consequently, the molded resin body 25 is formed on the top surface of the upper wing 2. By charging synthetic resin into the concave portions 23 of the projections 21, the molded resin body 25 is fixed firmly. Consequently, the slider having the round thread 32 as the thread body 30 fixed to the body 1 firmly is produced.

Figure 12:
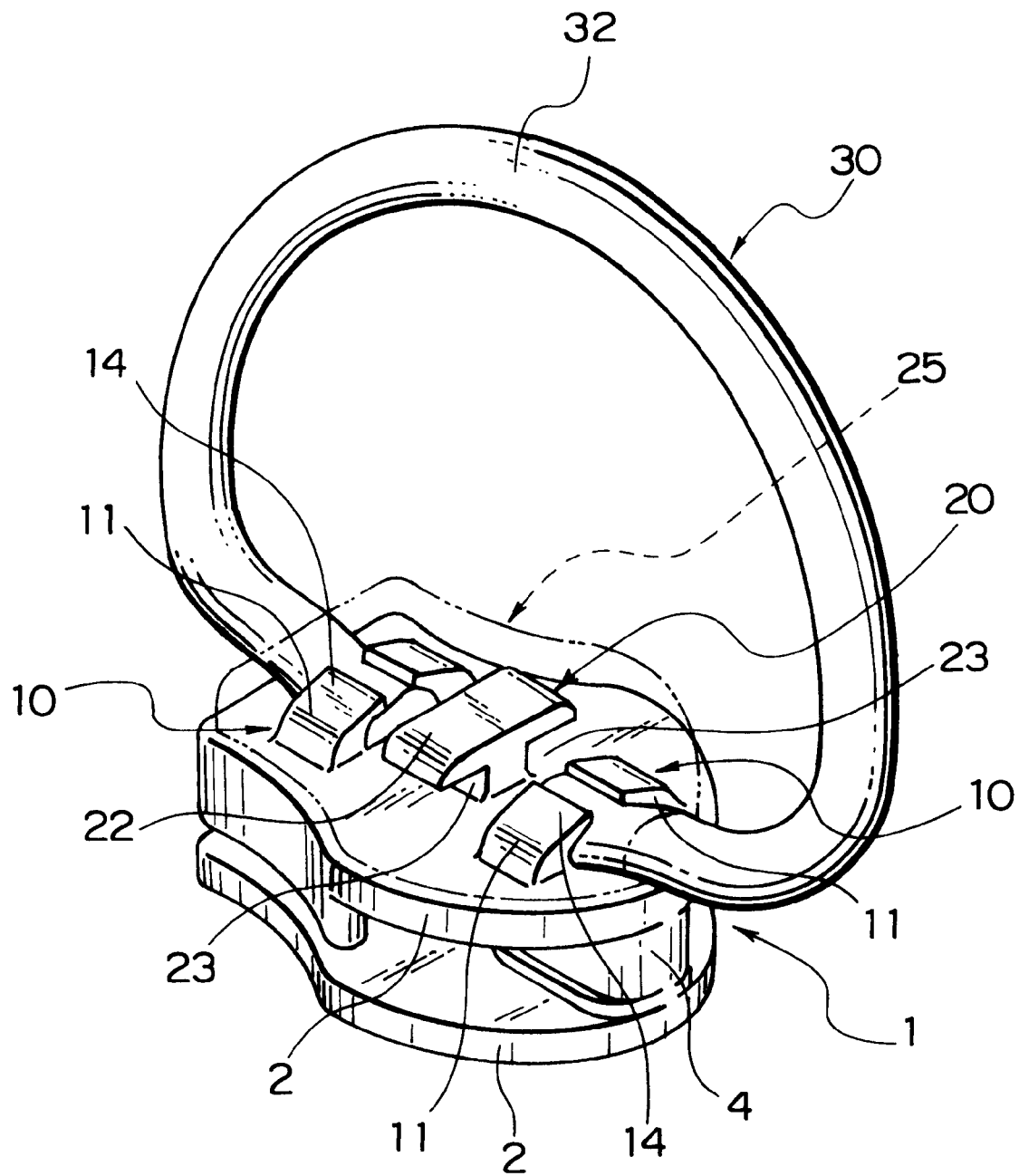
FIG. 12 is a perspective view of the slider for slide fastener according to a sixth embodiment at the time of attachment of the thread body.

In a slider of a sixth embodiment shown in FIG. 12, a pair of the tongue pieces 11 each having a narrowed tip are provided so as to protrude such that they oppose each other laterally to form the thread attachment portions 10 at each of the front end and rear end on the upper wing 2 of the slider body 1. Then, a T-shaped projection 22 lower than the tongue pieces 11 is provided so as to project in the center between the two thread attachment portions 10.

In the slider body 1 formed in the above manner, an end of the round thread 32 of a desired length is placed between the pair of the tongue pieces 11 provided so as to protrude on the side of the front end of the upper wing 2 and the tongue pieces 11 are crimped so as to be bent inward from above to form the crimped portion 14. Then, the other end of the round thread 32 is placed between the pair of the tongue pieces 11 provided on the side of the rear end and the tongue pieces 11 are crimped so that they are bent inward from above to form the crimped portion 14. As a result, the round thread 32 is attached in a ring shape with respect to the body 1.

In the body 1 on which the thread body 30 is attached, synthetic resin is insert-molded so as to bury and cover the front and rear portions which fix the round thread 32 and the projecting piece 22 in the center so as to form the molded resin body 25 on the top face of the upper wing 2. Synthetic resin is charged into the concave portion 23 of the projecting piece 22 so that the molded resin body 25 is fixed firmly. Consequently, the slider having the round thread 32 firmly attached in the ring shape to the body 1 is produced.

Figure 13:
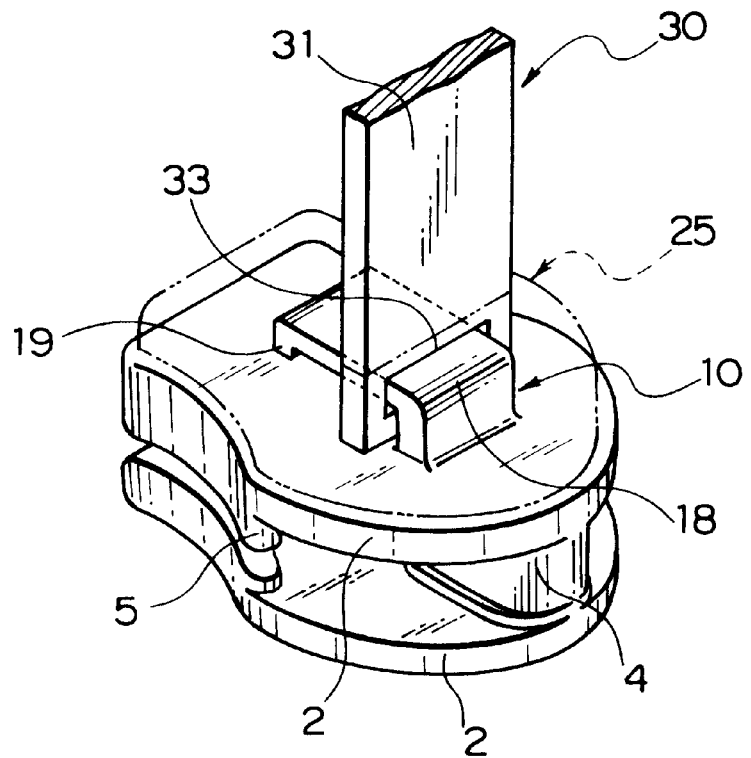
FIG. 13 is a perspective view of the slider for slide fastener according to a seventh embodiment at the time of attachment of the thread body.
Figure 14:
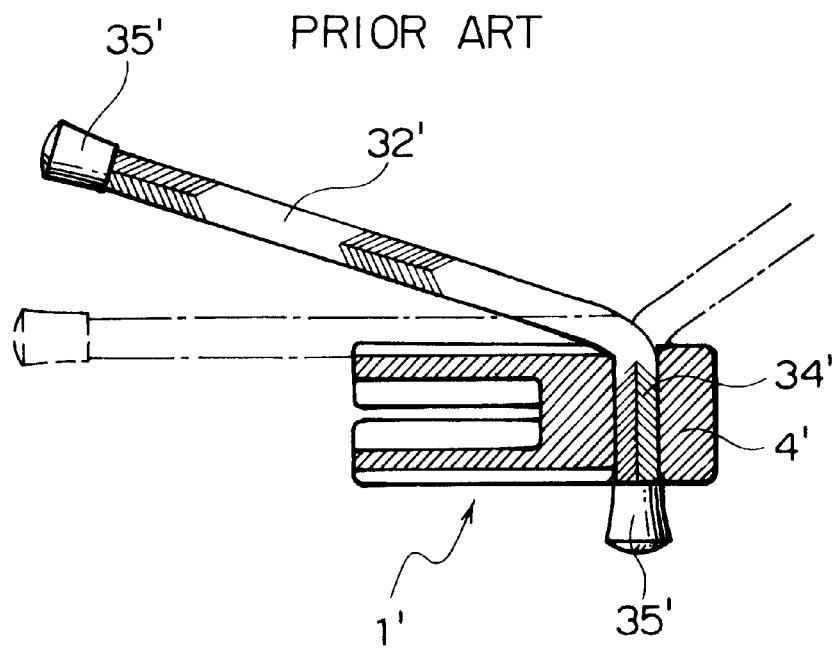
FIG. 14 is a longitudinal sectional view of a well known slider for slide fastener.
Figure 15:
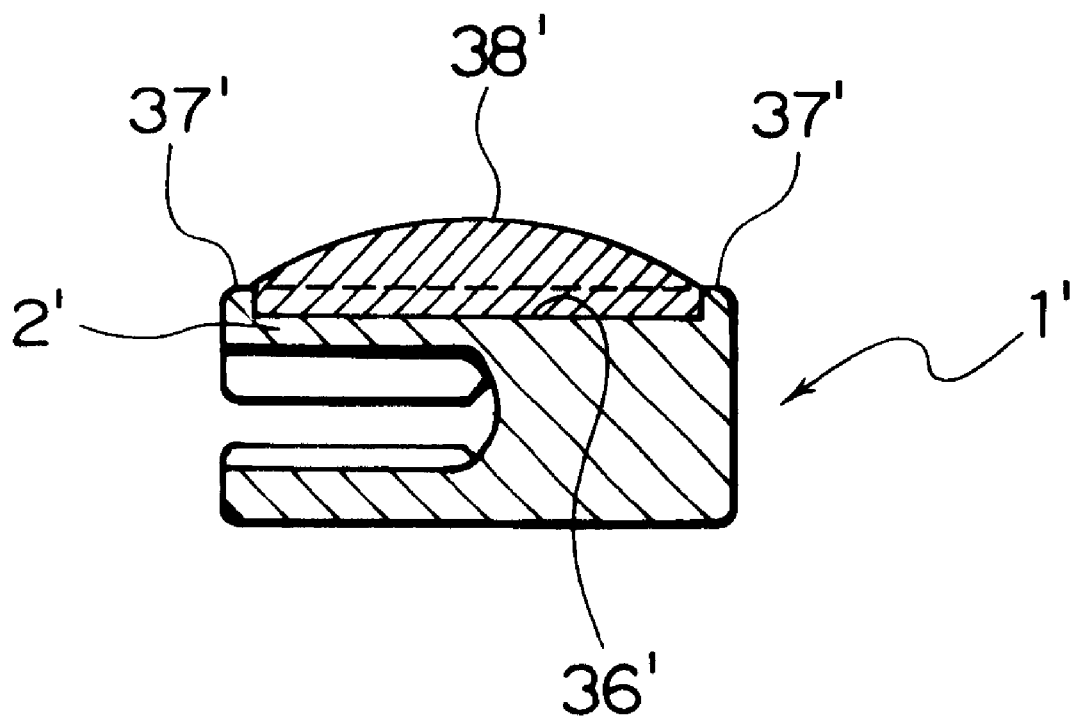
FIG. 15 is a longitudinal sectional view of another well known slider for slide fastener.

Finally, the slider of a seventh embodiment shown in FIG. 13 will be described. A hook plate 18 providing a wide hook shape extending from a front end toward a rear end is disposed in the center portion on the top face of the upper wing 2 of the slider body 1 so as to form the thread attachment portion 10 and a downward facing small protrusion 19 is formed to prevent an escape of the thread body 30 at a lower end of the hook plate 18. When the hook plate 18 is formed so as to extend from the front end toward the rear end, it is advantageous in terms of the function of the slider.

To attach the thread body 30 to the hook plate 18 acting as the thread attachment portion 10, a hole portion 33 is made at an end of the flat thread 31 for use as the thread body 30 such that the hook plate 18 is capable of entering this hole portion 33. The flat thread 31 having the hole portion 33 is inserted from the side of the small protrusion 19 of the hook plate 18 and held. Then, synthetic resin is inert-molded on the upper wing 2 so as to bury and cover the hook plate 18 to form the molded resin body 25 on the top face of the upper wing 2.

Synthetic resin is charged in a gap between a portion of the hook plate 18 in which the thread body 30 does not exist and the upper wing 2, so that the molded resin body 25 is formed so as to fix the thread body 30 firmly. Therefore, it is not necessary to provide the fixing portion 20 for fixing the molded resin body 25 additionally on the upper wing 2. The hook plate 18 provided on the upper wing 2 serves as the fixing portion 20 at the same time, thereby achieving the function of the fixing portion 20.

The slider for slide fastener of the present invention has the structure described above and the following effects are achieved with this structure.

According to the main aspect of the invention, the thread attachment portion 10 to which a thread body 30 is to be attached as a pull is provided integrally on the top surface of a wing 2 of a slider body 1, while the thread body 30 is fixed to the thread attachment portion 10 and synthetic resin is insert-molded to bury and cover the fixed portion so that molded resin body 25 is formed over the thread attachment portion 10. Therefore, the slider body 1 has a smooth surface having no fear that it may injure the user and the slider is allowed to slide easily. Further, the slider may be finished in an excellent appearance.

According to the invention, a fixing portion 20 for fixing the molded resin body 25 is provided so as to protrude on a top surface of the wing 2 and synthetic resin is insert-molded to bury and cover the fixing portion 20 so that the molded resin body 25 is formed. Therefore, the thread body 30 can be fixed in a stabilized condition on the body 1 of the slider as a pull and the molded resin body 25 itself can be fixed on the body 1 easily and firmly.

According to the invention, the thread attachment portion 10 is formed by arranging tongue pieces 11 protruded from the top surface of the wing 2 such that they oppose each other and the thread body 30 is placed between the tongue pieces 11 so that the tongue pieces 11 are crimped over the thread body 30 to fix the thread body 30 while the molded resin body 25 is formed. Therefore, the thread body 30 composed of a flat thread 31 or a round thread 32 can be fixed on the slider body 1 easily in a simple structure.

According to the invention, the thread attachment portion 10 is formed by providing an inverted U-shaped protruding plate 12 on the top surface of the wing 2 and the thread body 30 is inserted into an insertion hole 13 formed inside the protruding plate 12 and a part of the protruding plate 12 is crimped to fix the thread body 30, while the molded resin body 25 is formed. Therefore, the thread body 30 can be fixed to the slider body 1 as a pull easily and accurately and further, it is not necessary to provide additional fixing portions on the side of the front shoulder of the slider body 1.

According to the invention, the thread attachment portion 10 is formed by providing an inverted U-shaped protruding piece 15 on the top surface of the wing 2; the center of the protruding piece 15 is cut off or separated to form a notch portion 16; the thread body 30 is inserted inside the protruding pieces 15 and the protruding piece 15 are crimped to fix the thread body 30, while the molded resin body 25 is formed. Therefore, the thread body 30 can be fixed to the slider body as a pull in a simple and accurate condition.

According to the invention, the thread attachment portion 10 is formed by providing an arch piece 17 protruded in an arch shape on the top surface of the wing 2 and the thread body 30 is inserted into the arch piece 17 and the molded resin body 25 is formed. Therefore, the thread body 30 can be attached to the slider body 1 easily and further, the molded resin body 25 can be fixed firmly in a good appearance.

According to the invention, the thread attachment portion 10 is formed on each of two positions front and rear of the wing 2 and an end portion of the thread body 30 is fixed on each thread attachment portion 10 while the molded resin body 25 is formed. Therefore, the thread body 30 composed of a round thread 32 can be attached and fixed to the slider body 1 easily in a ring like shape and the operability of the slider is very excellent.

According to the invention, the thread attachment portion 10 is formed by providing a hook plate 18 on the top surface of the wing 2 and by inserting the hook plate 18 into a hole portion 33 provided in a base portion of the thread body 30, the thread body 30 is attached to the hook plate 18 while the molded resin body 25 is formed. Therefore, the thread body 30 can be attached and fixed to the slider body 1 easily and further, it is not necessary to provide a special fixing portion for fixing the molded resin body 25.

According to the invention, the fixing portion 20 for the molded resin body 25 is formed by bending ends of the tongue pieces 11 protruded from the top surface of the wing 2. Therefore, the molded resin body 25 can be formed and fixed by the fixing portion 20 having a simple structure and which can be produced easily.

According to the invention, the fixing portion 20 for the molded resin body 25 is formed by cutting off a base portion of the projection 21 provided so as to project on the top surface of the wing 2 so that a concave portion 23 is formed. Therefore, the molded resin body 25 can be formed and fixed to the slider body 1 in such a condition that it is never peeled or separated.

According to the invention, the fixing portion 20 for the molded resin body 25 is formed by providing a T-shaped projecting piece 22 on the top surface of the wing 2. Therefore, the molded resin body 25 can be formed and fixed to the slider body 1 firmly in a balanced configuration. As described above, the effects which the present invention produces are very remarkable.

What is claimed is:

1. A slider for slide fastener having a thread attachment portion to which a thread body is to be attached as a pull, the thread attachment portion extending outwardly from a top surface of a wing of a slider body, wherein the thread body is fixed to said thread attachment portion, and wherein synthetic resin is insert-molded to bury and cover said thread attachment portion so that a molded resin body is formed.

2. A slider for slide fastener according to claim 1, wherein a fixing portion for fixing the molded resin body is provided so as to protrude on the top surface of the wing and wherein the synthetic resin is insert-molded to also bury and cover the fixing portion so that the molded resin body is formed.

3. A slider for slide fastener according to claim 2, wherein the fixing portion for the molded resin body is formed by bending ends of the tongue pieces protruded from the top surface of the wing.

4. A slider for slide fastener according to claim 2, wherein the fixing portion for the molded resin body is formed by cutting off a base portion of the projection provided so as to project on the top surface of the wing so that a concave portion is formed.

5. A slider for slide fastener according to claim 2, wherein the fixing portion for the molded resin body is formed by providing a T-shaped projecting piece on the top surface of the wing.

6. A slider for slide fastener according to claim 1, wherein the thread attachment portion is formed by arranging tongue pieces protruded from the top surface of the wing such that they oppose each other and the thread body is placed between the tongue pieces so that the tongue pieces are crimped over the thread body to fix the thread body while the molded resin body is formed.

7. A slider for slide fastener according to claim 1, wherein the thread attachment portion is formed by providing an inverted U-shaped protruding plate on the top surface of the wing and the thread body is inserted into an insertion hole formed inside the protruding plate and a part of the protruding plate is crimped to fix the thread body, while the molded resin body is formed.

8. A slider for slide fastener according to claim 1, wherein the thread attachment portion is formed by providing an inverted U-shaped protruding piece on the top surface of the wing; the center of the protruding piece is cut off or separated to form a notch portion; the thread body is inserted inside the protruding pieces and the protruding pieces are crimped to fix the thread body, while the molded resin body is formed.

9. A slider for slide fastener according to claim 1, wherein the thread attachment portion is formed by providing an arch piece protruded in an arch shape on the top surface of the wing and the thread body is inserted into the arch piece while the molded resin body is formed.

10. A slider for slide fastener according to claim 1, wherein the thread attachment portion is formed on each of two positions front and rear of the wing and an end portion of the thread body is fixed on each thread attachment portion while the molded resin body is formed.

11. A slider for slide fastener according to claim 1, wherein the thread attachment portion is formed by providing a hook plate on the top surface of the wing and by inserting said hook plate into a hole portion provided in a base portion of the thread body, the thread body is attached to said hook plate while the molded resin body is formed.

* * * * *